June 30, 1964 F. LOB 3,139,159
FILLING ARRANGEMENT FOR A TELESCOPIC SUSPENSION UNIT
Filed May 23, 1961 2 Sheets-Sheet 1

INVENTOR
Fritz Lob
By Richard Ewel
agt

June 30, 1964    F. LOB    3,139,159
FILLING ARRANGEMENT FOR A TELESCOPIC SUSPENSION UNIT
Filed May 23, 1961    2 Sheets-Sheet 2

INVENTOR
Fritz Lob

United States Patent Office 3,139,159
Patented June 30, 1964

3,139,159
FILLING ARRANGEMENT FOR A TELESCOPIC SUSPENSION UNIT
Fritz Lob, Schweinfurt (Main), Germany, assignor to Fichtel & Sachs A.G., Schweinfurt (Main), Germany, a corporation of Germany
Filed May 23, 1961, Ser. No. 111,962
Claims priority, application Germany June 1, 1960
7 Claims. (Cl. 188—100)

This invention relates to telescopic suspension units, such as shock absorbers or springs of the hydro-pneumatic type, for motor vehicles and the like, and is more particularly concerned with a filling arrangement for admitting pressure fluid to such a unit.

Shock absorbers and hydro-pneumatic springs are commonly filled with fluid under pressure through valves which admit gas, liquid, or both, as the case may be, and prevent the escape of pressure fluid from the filled suspension unit. Where liquid and gas are contained in the same space within the suspension unit, they may be admitted sequentially through the same filling valve. Where they occupy separate spaces, it has been usual to provide separate valves.

These valves, which necessarily constitute integral portions of the suspension unit, increase the bulk and weight of the unit. The valves therefore have been made as small as possible, and the size of the sealing valve faces has been correspondingly small. It is difficult, however, to establish a reliably tight seal between small valve faces, and loss of fluid pressure from suspension units because of valve leakage has been a significant source of difficulties with these units. Particularly in hydro-pneumatic suspension units which contain both liquid and gas, proper functioning is predicated on precisely maintained gas pressure and liquid volume, and leakages seriously interfere with the proper working of the units.

An object of the present invention is the provision of a filling arrangement which does not require a separate filling valve.

Another object is the provision of a suspension unit in which the pressure space is sealed from the outside by cooperation of relatively large sealing faces.

Generally, the invention aims at facilitating the filling or refilling of suspension units of the type described with gas or liquid under pressure.

With these and other objects in view, the invention provides an improvement in a telescopic suspension unit of otherwise conventional type in which a piston is axially reciprocable in the cavity of a cylinder, and the piston rod passes through an opening in a radially extending cylinder wall. According to a basic feature of the invention, a resilient sealing means is interposed between the cylinder wall and the piston rod, and forms a sealing connection between the rod and the wall when the fluid pressure in the cylinder cavity is higher than in the space outwardly adjacent the radially extending cylinder wall. When the pressure in the cylinder cavity is lower, the sealing means permits passage of fluid from the last mentioned space into the cylinder cavity.

Other features and many of the attendant advantages of this invention will be readily appreciated as the same becomes better understood by reference to the following detailed description of preferred embodiments of the invention when considered in connection with the accompanying drawings in which like reference numerals designate like parts throughout the several figures thereof, and where in:

Figure 1:
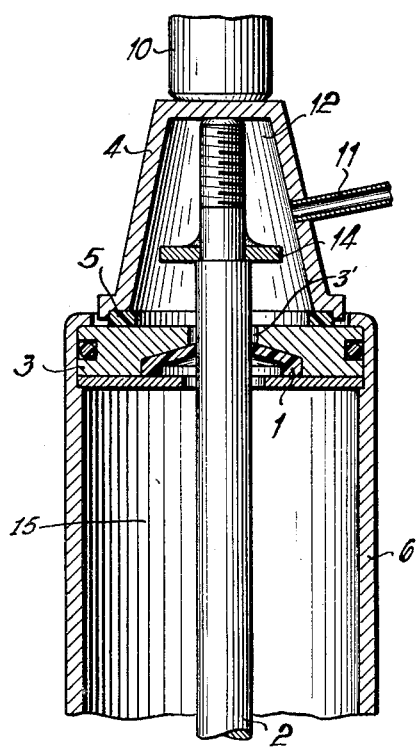
FIG. 1 shows a first embodiment of the suspension unit of the invnetion in axially sectional fragmentary side elevation.

Referring now to the drawing in detail, and initially to FIG. 1, there is seen a telescopic suspension unit which may serve as a hydropneumatic spring or a shock absorber. Only a portion of the unit is visible in section through the axis of the cylinder 6 which encloses the cylinder cavity 15. A piston of which only the piston rod 2 is seen is axially reciprocable in the cavity 15. The axial end of the cavity 15 which is visible in the drawing is closed by a radially extending wall 3 in an axial opening of which the piston rod 2 is guided. The cross sectional area of the piston rod 2 is smaller than that of the opening so as to leave an annular clearance 3' between the rod 2 and the wall 3.

A seal 1 which has the shape of a dish with a central opening is inserted into the wall 3. The peripheral portions of the seal 1 are heavy and relatively stiff, but the central portion about the opening is thinner and quite flexible so that it can move axially responsive to a fluid pressure differential. The seal 1 assumes the position shown in FIG. 1 when it is relaxed, or when the pressure inside the cavity 15 prevails. The gasket is in tight sealing engagement with the piston rod 2. The rod carries a coaxial abutment disc 14.

The filling device of my invention includes a bell 4 which is in fluid tight engagement with the wall 3 by means of an interposed annular gasket 5. The bell 4 encloses a pressure space 12 about the free end of the piston rod 2 and the disc 14.

The unit is held in a clamping vise or press of which only one jaw is represented by the cylindrical anvil 10. It will be understood that the other jaw of the vise or press is applied to the end of the cylinder 6 not shown in the drawing so that the bell 4 is tightly held against the gasket 5 and the wall 3. A nipple 11 on the bell 4 permits fluid to be admitted under pressure under the bell 4 while it is held in place by the clamping vise.

The suspension unit shown in FIG. 1 is filled or replenished as follows:

The gasket 5 is placed in position and the bell 4 is put on it. The unit is then clamped in the vise, and the nipple 11 is connected to a source of compressed gas or of liquid under pressure. The pressure fluid enters the pressure space 12 and penetrates along the piston rod 2 to the seal 1. When the pressure differential between the space 12 and the cavity 15 reaches a certain value, the annular lip of the seal 1 moves axially inward along the rod 2. It expands, and thereby opens a passage for the fluid into the cavity 15.

The pressure in the space 12 and in the cylinder cavity 15 rises. The anvil 10 may be spring loaded as will be shown hereinafter. When the fluid pressure under the bell reaches a desired maximum value, the bell 4 is lifted from the gasket 5 and overcomes the spring force of the anvil 10 so that the pressure to which the suspension unit is to be filled may be selected in a simple manner by suitable selection or adjustment of the spring, not shown in FIG. 1.

In many suspension units of the type partly illustrated in FIG. 1, the piston attached to the rod 2 and not shown in the drawing is equipped with a valve which permits pressure fluid to pass from the cylinder cavity 15 into a cylinder space under the piston in which the piston has a larger effective face than in the cavity 15 because of the absence of the piston rod 2. When the pressure is the same under the piston and in the cavity 15, the forces acting on the piston urge the piston outward of the cavity 15. The resultant force thus causes the piston rod 2 to abut against the bell 4 as shown in FIG. 1, and this force, the magnitude of which is readily calculated for any desired fluid pressure, must be taken into account when selecting the spring force on the anvil 10 which determines the maximum fluid pressure to which the suspension unit can be filled.

As soon as the pressure space 12 is opened to the surrounding atmosphere, its pressure drops, and the elastic forces of the seal 1 cause the latter to return to the position shown in FIG. 1 in which the seal prevents the escape of fluid from the cavity 15. As will be shown later, the outward movement of the piston rod 2 may further be employed to shut off the source of pressure fluid.

When filling is completed, the bell 4 is taken off. The gasket 5 may also be removed or it may stay in place permanently. Any fluid present under the bell at this time cannot readily be recovered. Where the fluid is hydraulic liquid, it may be desirable to reduce waste losses of liquid.

Figure 2:
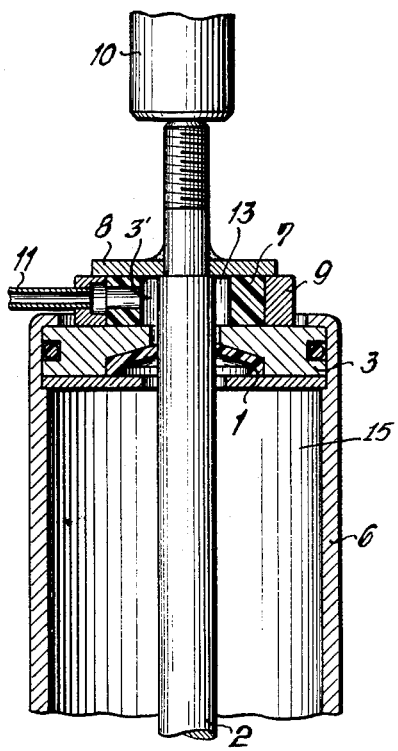
FIG. 2 illustrates another embodiment of the suspension unit of my invention in a view corresponding to that of FIG. 1.
Figure 4:
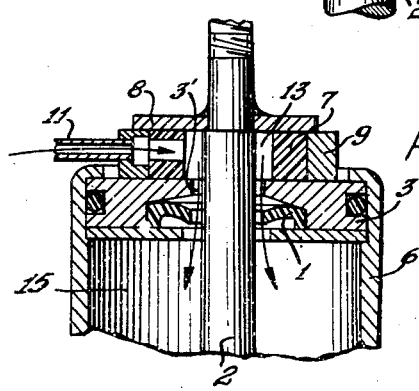
FIG. 4 shows a portion of the apparatus of FIG. 2 while being refilled.

Another embodiment of my invention is shown in FIG. 2 in its normal operating condition, and is partly shown in FIG. 4 with the seal 1 opened by the pressure of a fluid entering the cavity 15 from the nipple 11 as indicated by the arrows. The suspension unit of FIGS. 2 and 4 has a pressure space 13 substantially smaller than the space under the bell 4 in FIG. 1, and thereby reduces the loss of pressure fluid after filling to a very small amount. The pressure space 13 is radially enclosed in a short tube 7 of resilient material which is backed by a split ring 9 of metal or other rigid material. In the relaxed condition, the tube 7 has an axial length substantially greater than that of the ring 9.

The abutment disc 8 on the piston rod 2 is larger in diameter than the disc 14 shown in FIG. 1, and its diameter is greater than the external diameter of the tube 7. The nipple 11 is fastened in a radial bore of the ring 9 which communicates with the pressure space 13 by an aligned radial passage in the tube 7.

As seen in FIG. 2, the unit is clamped between the anvil 10 and the other jaw of a clamping vise or press, not otherwise shown. The anvil 10 is pressed against the free end of the piston rod 2, thereby forcing the piston inward in the cylinder cavity 15 until the disc 8 compresses the tube 7 and bears down on the ring 9 whereby the pressure space 13 is sealed. The abutment disc 8 constitutes the axial cover of the space 13.

The apparatus illustrated in FIG. 2 operates substantially in the same manner as that shown in FIG. 1. If the maximum filling pressure of the unit is to be determined by a spring urging the anvil 10 against the piston rod 2, the axially outward pressure of the fluid is relied upon in the manner described above to lift the disc 8 from the tube 7. The source of pressure fluid may then be disconnected from the nipple 11 either automatically or by hand. The unit is taken from the vise or press, and the piston rod 2 is permitted to move outward from the position illustrated in FIG. 2. The several pieces of the ring 9 which are circumferentially connected in a well known manner may then be disengaged, and the opened ring is removed. The resilient tube 7 is preferably left in place. When not under radially outward pressure it may contract so as to serve as a wiper which wipes dust and other contaminants from the piston rod 2 as the latter moves into the cavity 15. The tube 7 also acts as a resilient buffer between the abutment disc 8 and the cylinder 6 when the suspension unit is compressed to the limit by a heavy load increase.

Since the relatively large and rugged seal 1 assumes the functions of the check valve which is needed in filling devices for pressure fluid filled suspension units, the units of my invention are virtually leak proof. The seal 1 is neither heavier nor bulkier than those piston rod seals which are now commonly used in suspension units of this type. The weight of the small nipple 11 is not necessarily significant. In the arrangement shown in FIG. 2, the nipple 11 is removed together with the ring 9 after filling. It may however be arranged on the disc 8 instead of the ring 9, and left in place permanently, if so desired, without unduly burdening the suspension unit.

Figure 3:
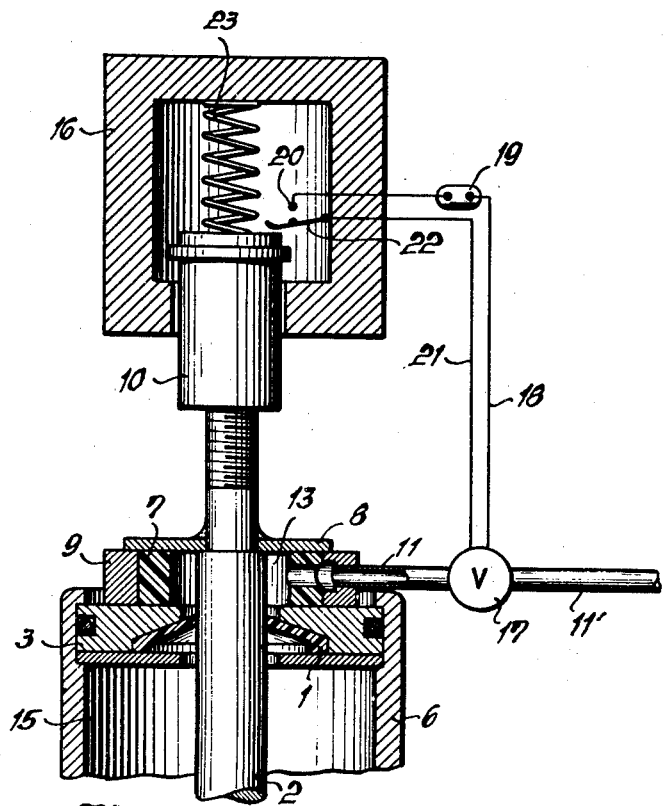
FIG. 3 is an axially sectional elevational view of a portion of a modification of the apparatus of FIG. 2.

FIG. 3 shows the suspension unit of FIG. 2 held in a clamping vise or press equipped with an automatic shut-off for the pressure fluid. The anvil 10 is axially slidable in the frame 16 of the clamping press or vise, and is urged against the piston rod 2 by a helical spring 23 which is interchangeable with other springs for convenient control of the maximum fluid pressure in the filled suspension units.

The nipple 11 communicates with a pressure line 11' equipped with an electrically closed valve 17. The valve is a solenoid valve which may be moved manually toward the open position. The electric circuit of the valve solenoid includes a current source 19 such as the terminals of a wiring outlet, and a normally open single pole single throw switch arranged in series with the current source 19 and the solenoid of the valve 17. The fixed contact 20 of the switch is mounted on the frame 16 and the movable contact 22 is pivotable on the frame 16 about an axis transverse to the direction of movement of the anvil 10. A portion of the movable switch contact 22 extends into the path of the anvil 10. The switch 20, 22 actuates the valve 17 in response to the fluid pressure in the space 13.

When the fluid pressure in the cylinder cavity 15 and in the pressure space 13 reaches a predetermined value, the piston rod 2 moves the anvil 10 against the force of the spring 23 and the switch 22, 20 is closed. The valve 17 then shuts off the flow of pressure fluid from the line 11' toward the nipple 11 until the valve is again opened by hand.

The arrangement shown in FIG. 3 may be set in such a manner that the anvil 10 closes the circuit of the valve 17 before the seal between the tube 7, the disc 8, and the wall 3 is broken. Alternatively, the position of the switch members 20, 22 may be selected in such a manner that the pressure is at least partly released from the space 13 before the anvil 10 actuates the movable switch member 22, and that the circuit of the valve 17 is closed as the anvil moves further under its own moment of inertia.

Many other modifications and variations of the filling arrangement of the invention will readily suggest themselves to those skilled in the art on the basis of my teachings which provide a suspension unit not burdened by bulky or weighty filling valves when in operation. The suspension units of my invention are characterized by the convenience with which they may be filled to precisely predetermined pressures, and the devices illustrated are merely illustrative of the many forms which this invention may assume.

It will be understood, therefore, that it is intended to cover all changes and modifications of the examples of the invention herein chosen for the purpose of the disclosure which do not constitute departures from the spirit and scope of the invention set forth in the appended claims.

What I claim is:

1. In a telescopic suspension unit, in combination, a cylinder member defining a cylinder cavity therein, said member including a radially extending end wall formed with an axial opening communicating with said cavity; a piston member axially reciprocable in said cavity, said piston member including piston rod means extending through said opening for movement between a space outwardly adjacent said wall and said cavity when said piston member reciprocates, the radial cross section of said rod means being smaller than the cross section of said opening; resilient sealing means interposed between said wall and said piston rod means, said sealing means being responsive to a fluid pressure differential between said cavity and said space to sealingly connect said piston rod means to said wall when fluid pressure in said cavity is higher than fluid pressure in said space, and to permit passage of fluid from said space to said cavity when fluid pressure in said space is higher than in said cavity; closure means sealingly engageable with said cylinder member for enclosing said space; and a conduit communicating with said space for admitting fluid under pressure thereto.

2. In a unit as set forth in claim 1, said closure means being sealingly engageable with said wall.

3. In a unit as set forth in claim 1, said closure means including an axially resilient tubular wall portion extending about said piston rod means and a cover member axially closing said space.

4. In a telescopic suspension unit, in combination:
 (a) a cylinder member defining a cylinder cavity therein, said member including a radially extending wall formed with an axial opening communicating with said cavity;
 (b) a piston member axially reciprocable in said cavity,
  (1) said piston member including piston rod means extending through said opening for movement between a space outwardly adjacent said wall and said cavity when said piston member reciprocates,
  (2) the radial cross section of said rod means being smaller than the cross section of said opening;
 (c) resilient sealing means interposed between said wall and said piston rod means,
  (1) said sealing means being responsive to a fluid pressure differential between said cavity and said space to sealingly connect said piston rod means to said wall when fluid pressure in said cavity is higher than fluid pressure in said space, and to permit passage of fluid from said space to said cavity when fluid pressure in said space is higher than in said cavity;
 (d) closure means sealingly engageable with said cylinder member for enclosing said space, said closure means including
  (1) a resilient tubular wall member in sealing engagement with said radially extending wall and extending about said piston rod means,
  (2) a rigid wall member radially containing said resilient wall member, and
  (3) a cover member axially superimposed on said resilient wall member; and
 (e) a conduit communicating with said space for admitting fluid under pressure thereto.

5. In a unit as set forth in claim 4, said cover member being mounted on said piston rod means.

6. In a telescopic suspension unit, in combination:
 (a) a cylinder member defining a cylinder cavity therein, said member including a radially extending wall formed with an axial opening communicating with said cavity;
 (b) a piston member axially reciprocable in said cavity,
  (1) said piston member including piston rod means extending through said opening for movement between a space outwardly adjacent said wall and said cavity when said piston member reciprocates,
  (2) the radial cross section of said rod means being smaller than the cross section of said opening;
 (c) resilient sealing means interposed between said wall and said piston rod means,
  (1) said sealing means being responsive to a fluid pressure differential between said cavity and said space to sealingly connect said piston rod means to said wall when fluid pressure in said cavity is higher than fluid pressure in said space, and to permit passage of fluid from said space to said cavity when fluid pressure in said space is higher than in said cavity;
 (d) closure means sealingly engageable with said cylinder means for enclosing said space;
 (e) a conduit communicating with said space for admitting fluid under pressure thereto;
 (f) valve means in said conduit; and
 (g) valve actuating means responsive to a predetermined fluid pressure in said space to actuate said valve means and thereby to close said conduit.

7. In a unit as set forth in claim 6, said closure means including a cover member fixedly mounted on said piston rod means, and axially closing said space when said piston rod means is in a predetermined position; and resilient means permanently urging said piston rod means to move into said predetermined position thereof against the pressure of a fluid in said space.

References Cited in the file of this patent

UNITED STATES PATENTS

| | | |
|---|---|---|
| 2,476,324 | Reich | July 19, 1949 |
| 2,530,504 | Boyer | Nov. 21, 1950 |
| 2,708,573 | Rovoldt | May 17, 1955 |
| 2,882,592 | De Carbon | Apr. 21, 1959 |
| 2,930,608 | Hogan et al. | Mar. 29, 1960 |
| 2,939,696 | Tuczek | June 7, 1960 |
| 2,977,111 | Tuczek | Mar. 28, 1961 |

FOREIGN PATENTS

| | | |
|---|---|---|
| 632,497 | Great Britain | Nov. 28, 1949 |
| 1,021,218 | Germany | Dec. 19, 1957 |